US008061195B2

(12) United States Patent
Jones, III (10) Patent No.: US 8,061,195 B2
(45) Date of Patent: Nov. 22, 2011

(54) FLOW CONTROL ASSEMBLY

(76) Inventor: Tommy Jefferson Jones, III, Wylie, TX (US)

( * ) Notice: Subject to any disclaimer, the term of this patent is extended or adjusted under 35 U.S.C. 154(b) by 123 days.

(21) Appl. No.: 12/463,253

(22) Filed: May 8, 2009

(65) Prior Publication Data

US 2010/0281997 A1 Nov. 11, 2010

(51) Int. Cl.
*G01F 3/14* (2006.01)
(52) U.S. Cl. .......................................... 73/248
(58) Field of Classification Search .............. 73/248, 73/861.42; 137/540, 538, 101
See application file for complete search history.

(56) References Cited

U.S. PATENT DOCUMENTS

| | | | |
|---|---|---|---|
| 2,729,234 A | 1/1956 | Stevenson | |
| 2,845,086 A | 7/1958 | Waterman | |
| 2,845,087 A | 7/1958 | Thomas | |
| 2,865,397 A | 12/1958 | Chenault | |
| 3,130,747 A | 4/1964 | Benaway | |
| 3,131,716 A | 5/1964 | Griswold et al. | |
| 3,145,730 A | 8/1964 | Presnell | |
| 3,155,111 A | 11/1964 | Presnell | |
| 3,170,481 A | 2/1965 | Presnell | |
| 3,277,924 A | 10/1966 | Nezworski | |
| 3,292,656 A | 12/1966 | Armstrong | |
| 3,339,580 A | 9/1967 | Cutler | |
| 3,381,708 A | 5/1968 | Chenoweth | |
| 3,422,842 A | 1/1969 | Erickson | |
| 3,424,196 A | 1/1969 | Donner | |
| 3,741,241 A | 6/1973 | Jackson | |
| 3,752,182 A | 8/1973 | Brand | |
| 3,752,183 A | 8/1973 | Griswold | |
| 3,752,184 A | 8/1973 | Griswold | |
| 3,756,272 A | 9/1973 | Hammond | |
| 3,854,497 A | 12/1974 | Rosenberg | |
| 3,872,884 A | 3/1975 | Busdiecker et al. | |
| 3,893,693 A * | 7/1975 | Skoyles | 303/115.2 |
| 4,051,864 A | 10/1977 | Iwatsuki | |
| 4,066,096 A | 1/1978 | Lind, Jr. | |
| 4,074,693 A | 2/1978 | Kates | |
| 4,080,993 A | 3/1978 | Lind, Jr. | |
| 4,147,177 A | 4/1979 | Iwatsuki | |
| 4,206,781 A | 6/1980 | Salter | |
| 4,230,147 A | 10/1980 | Booth et al. | |
| 4,437,493 A | 3/1984 | Okuda et al. | |
| 4,503,876 A * | 3/1985 | Farr | 137/101 |
| 4,605,039 A | 8/1986 | Johnson et al. | |

(Continued)

OTHER PUBLICATIONS

International Search Report and Written Opinion in PCT Application No. PCT/US10/33554, dated Jun. 29, 2010 (8 pages).

(Continued)

*Primary Examiner* — Jewel V Thompson
(74) *Attorney, Agent, or Firm* — Gardere Wynne Sewell LLP (57) ABSTRACT

A flow control device for automatically controlling the flow of a fluid at a predetermined rate that is capable of taking measurements of the pressure of the fluid within the device while the device is functioning and that is capable of real-time adjustment of the flow rate is provided. Said device includes a casing having a casing outlet, a piston having a piston inlet and an edge, wherein said piston interfaces with the casing in a manner such that the edge is cooperable with the casing outlet to control the flow of fluid through the device. A biasing member, such as a spring, for biasing the casing with the piston is further included, as is a sensor, such as a pressure transducer, for measuring the pressure within the interior of the casing.

32 Claims, 4 Drawing Sheets

U.S. PATENT DOCUMENTS

| | | |
|---|---|---|
| 4,724,866 A | 2/1988 | Bates et al. |
| 4,766,928 A | 8/1988 | Golestaneh |
| 4,825,916 A | 5/1989 | Fink, Jr. |
| 4,995,422 A | 2/1991 | Chew et al. |
| 5,054,516 A | 10/1991 | Okerblom |
| 5,097,863 A | 3/1992 | McCann et al. |
| 5,099,875 A | 3/1992 | Smietana |
| 5,174,330 A | 12/1992 | Golestan et al. |
| 5,265,643 A | 11/1993 | Golestan et al. |
| 5,301,713 A | 4/1994 | Skoglund |
| 5,383,489 A | 1/1995 | Golestan et al. |
| 5,388,899 A | 2/1995 | Volz et al. |
| 5,408,886 A * | 4/1995 | Lalin ................ 73/861 |
| 5,462,081 A | 10/1995 | Perusek et al. |
| 5,487,405 A | 1/1996 | Skoglund |
| 5,524,670 A | 6/1996 | Castle |
| 5,529,090 A | 6/1996 | Golestan et al. |
| 5,758,758 A * | 6/1998 | Friedrich ............ 192/85.57 |
| 5,845,815 A | 12/1998 | Vogel |
| 5,931,191 A | 8/1999 | Taube et al. |
| 6,026,850 A | 2/2000 | Newton et al. |
| 6,110,427 A * | 8/2000 | Uffenheimer ............ 422/81 |
| 6,161,572 A | 12/2000 | Credle et al. |
| 6,196,259 B1 | 3/2001 | Weber |
| 6,206,031 B1 | 3/2001 | Wilfert |
| 6,513,545 B2 | 2/2003 | Rhone et al. |
| 6,688,319 B2 | 2/2004 | Trantham et al. |
| 6,874,752 B2 | 4/2005 | Jorgensen |
| 6,920,895 B2 | 7/2005 | Avis et al. |
| 7,066,200 B2 | 6/2006 | Moesby et al. |
| 7,114,518 B2 | 10/2006 | Kirby |
| 7,128,087 B2 | 10/2006 | Jorgensen |
| 7,140,386 B2 | 11/2006 | Avis et al. |
| 7,156,120 B2 | 1/2007 | Cherfane et al. |
| 7,246,635 B2 | 7/2007 | Caleffi |
| 7,343,928 B2 | 3/2008 | Moesby |
| 2005/0284521 A1 | 12/2005 | Chang |
| 2007/0267592 A1 | 11/2007 | Jorgensen |
| 2007/0277885 A1 | 12/2007 | Goble |
| 2008/0245428 A1 | 10/2008 | Jorgensen |

OTHER PUBLICATIONS

Product brocuhure for Frese Alpha Cartridge (1 page).
Product brochure for Catlow Inc.'s "The Governor," copyright 1999 (1 page).

* cited by examiner

FLOW CONTROL ASSEMBLY

BACKGROUND

Field of the Invention

Flow control devices are commonly employed in a variety of applications, such as balancing heating, venting, and cooling (HVAC) systems and regulating flow through gasoline pump systems. Past attempts at regulating flow originated around the use of restricted orifices within the fluid line and the use of manually adjustable valves. However, these solutions failed to sufficiently overcome the problems associated with varying fluid pressure within the line, and thus, were not capable of accurately regulating flow. To overcome these problems, flow control devices capable of regulating flow and limiting it to a preset maximum despite varying fluid pressures within the line are commonly used.

Flow control devices capable of automatically regulating flow despite varying line pressures differ in design, but generally comprise a casing having a generally hollow interior, a casing inlet, and a casing outlet, a generally hollow piston having a piston inlet and an edge, wherein said piston is slidably mounted within the interior of the casing in a manner such that the edge is cooperable with the casing outlet to control the flow of fluid through the device, and a means, such as a spring, for biasing said casing with said piston. Additional embodiments may have the piston sliding over the casing or have an edge of the casing cooperating with the piston inlet to control, either alone or in combination with the effect of the piston edge cooperating with the casing outlet, the flow of fluid through the device.

Functionally, flow control devices are generally positioned within a line or valve housing and operate via a pressure differential between the upstream portion of the device and the downstream portion of the device. For example, in the common piston and casing design, as fluid flows through the piston inlet, the differential pressure increases across the piston and compresses the biasing means causing the casing outlet to be closed off by the edge of piston. As the casing outlet closes off, the pressure in the interior of the casing increases and, in conjunction with the force of the biasing means, works to equalize with the pressure upstream of the device. As the pressures approach equilibrium, the biasing means actuates the piston upward allowing the fluid outlets to reopen.

Although the prior art has been effective at regulating fluid flow under certain circumstances, the prior art has not been successful at accurately and precisely measuring the actual flow rate through a device in real time. Flow measurements of the type known in the prior art have relied on pressure measurements taken from positions in the fluid flow line upstream and downstream of the line position of the flow control device. While it is possible to calculate the rate of flow of a given fluid through a fixed orifice when the pressures upstream and downstream of the fixed orifice are known, it has not been possible to accurately and precisely calculate the rate of flow in the flow control devices of the prior art as such devices have at least one variable orifice such as, for example, a piston inlet or casing outlet that opens or closes as the piston element slides within the casing of the device. Because a variable orifice prevents the accurate and precise calculation of flow rate based on the pressures upstream and downstream of the orifice, prior art flow control devices have not been capable of real time flow rate measurements. In view of the limitations of the prior art, it has not been previously possible to accurately or precisely verify or adjust the flow rate of a given flow control device.

SUMMARY

The present design provides significant advantages over the prior art by calculating the flow rate of a given fluid based on pressure readings upstream of the flow control device and within the flow control device itself, without the interference of a variable orifice positioned between the pressure readings. Accurate and precise flow data of this type allows for fine tuning of automatic flow devices to achieve the desired flow rate despite minute variations in the tolerances of the device, calculated tensions of the biasing means, or friction caused by the interfacing of components of the device.

In accordance with one aspect of the present invention, a flow control assembly for controlling the flow of fluid is provided and includes a casing having an interior and a casing outlet. The flow control assembly further includes a piston having a piston inlet and an edge, wherein said piston interfaces with the casing in a manner such that the edge is cooperable with the casing outlet to control the flow of fluid through the assembly. A biasing member for biasing said casing with said piston is further included, as is a sensor for measuring pressure within assembly.

In accordance with another aspect of the present invention, a flow control assembly for controlling the flow of fluid is provided and includes a casing having an interior, an upstream casing section, and a downstream casing section, wherein said upstream casing section has a piston opening and said downstream casing section has a fluid exit port. The flow control assembly further includes a piston having an upstream piston section and a downstream piston section, wherein said upstream piston section has a fluid inlet port, said downstream piston section has an edge, and said piston slidably interfaces with the casing in a manner such that said edge is cooperable with said fluid exit port. A biasing member for biasing said casing with said piston is further included, as is a sensor for measuring the pressure within the assembly.

In accordance with another aspect of the present invention, a flow control assembly having a casing, piston, and biasing member is provided that includes a sensor for measuring the fluid pressure within the assembly.

In yet another embodiment of the present invention, the biasing member is a spring.

In yet another embodiment of the present invention, the sensor is a pressure transducer.

In yet another embodiment of the present invention, the sensor interfaces with the interior of the casing.

In yet another embodiment of the present invention, the sensor is positioned for measuring pressure at a point adjacent to the piston inlet (or fluid inlet port).

In yet another embodiment of the present invention, the flow control assembly further comprises a piston stop.

In yet another embodiment of the present invention, the piston stop is a retaining cap that interfaces with said piston.

In yet another embodiment of the present invention, the flow control assembly further comprises a fluid stop.

In yet another embodiment of the present invention, the fluid stop is a rolling membrane.

In yet another embodiment of the present invention, the flow control assembly further comprises a tension seat.

In yet another embodiment of the present invention, the tension seat interfaces with the biasing member to adjust the force applied by said biasing member to said piston.

In yet another embodiment of the present invention, the tension seat interfaces with a valve housing.

In yet another embodiment of the present invention, the flow control assembly further comprises a piston seat.

In yet another embodiment of the present invention, the piston seat has rounded edges.

In accordance with another aspect of the present invention, a method is provided for calculating the rate of flow in a flow control assembly having a fixed fluid inlet and a variable fluid outlet, said method comprising the steps of measuring the fluid pressure at a position upstream to the fixed fluid inlet, measuring the area of the fixed fluid inlet, and measuring the fluid pressure at a position downstream of the fixed fluid inlet but upstream of the variable fluid outlet.

DETAILED DESCRIPTION

In the description which follows, like parts are marked throughout the specification and drawings with the same reference numerals, respectively. The drawings are not necessarily to scale and certain features may be shown exaggerated in scale or in somewhat schematic form in the interest of clarity and conciseness.

Figure 1:
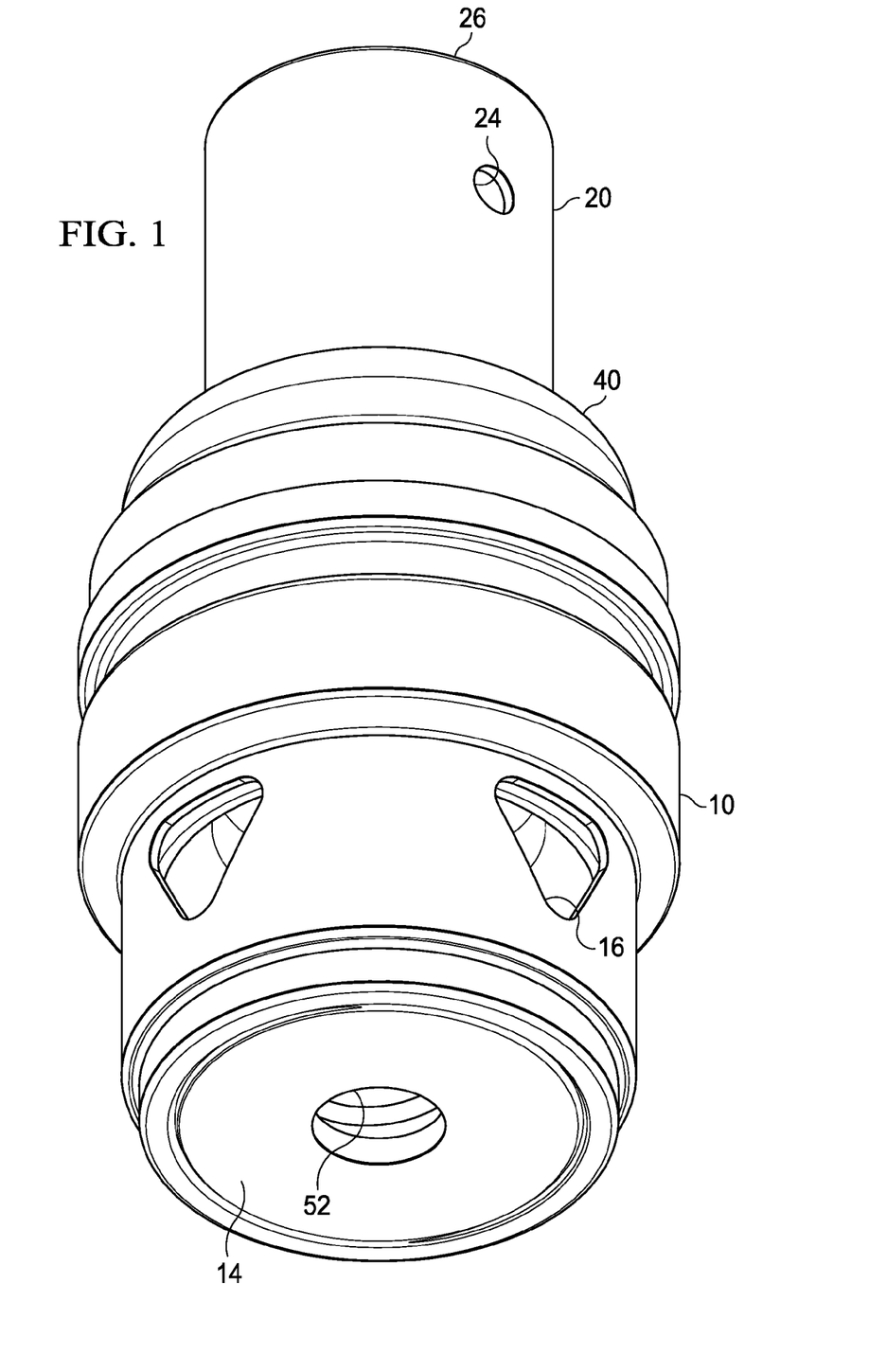
FIG. 1 is an isometric view, showing one embodiment of the fluid control device according to the present invention.
Figure 2:
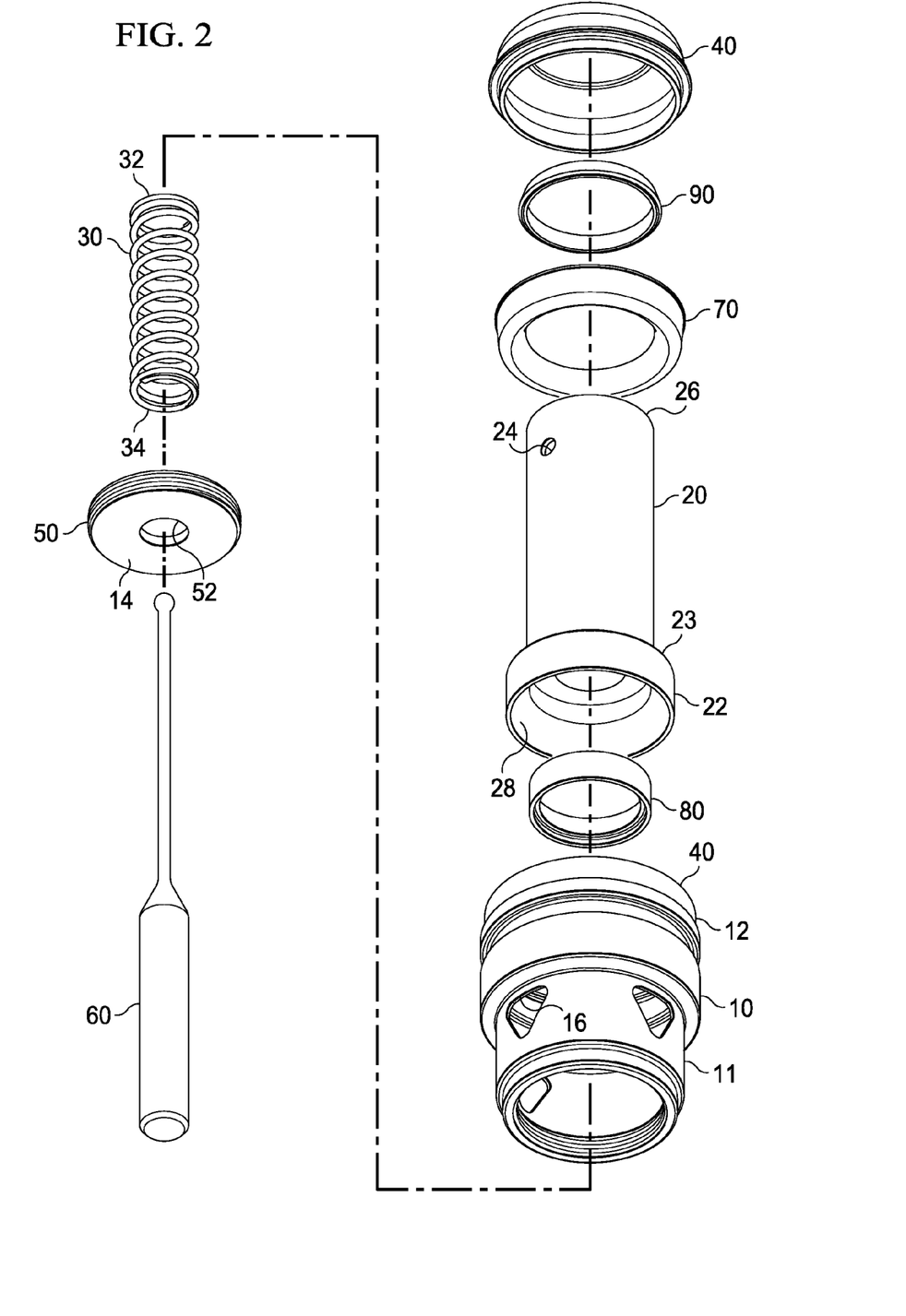
FIG. 2 is an isometric exploded view, showing one embodiment of the fluid control device according to the present invention.
Figure 3A:
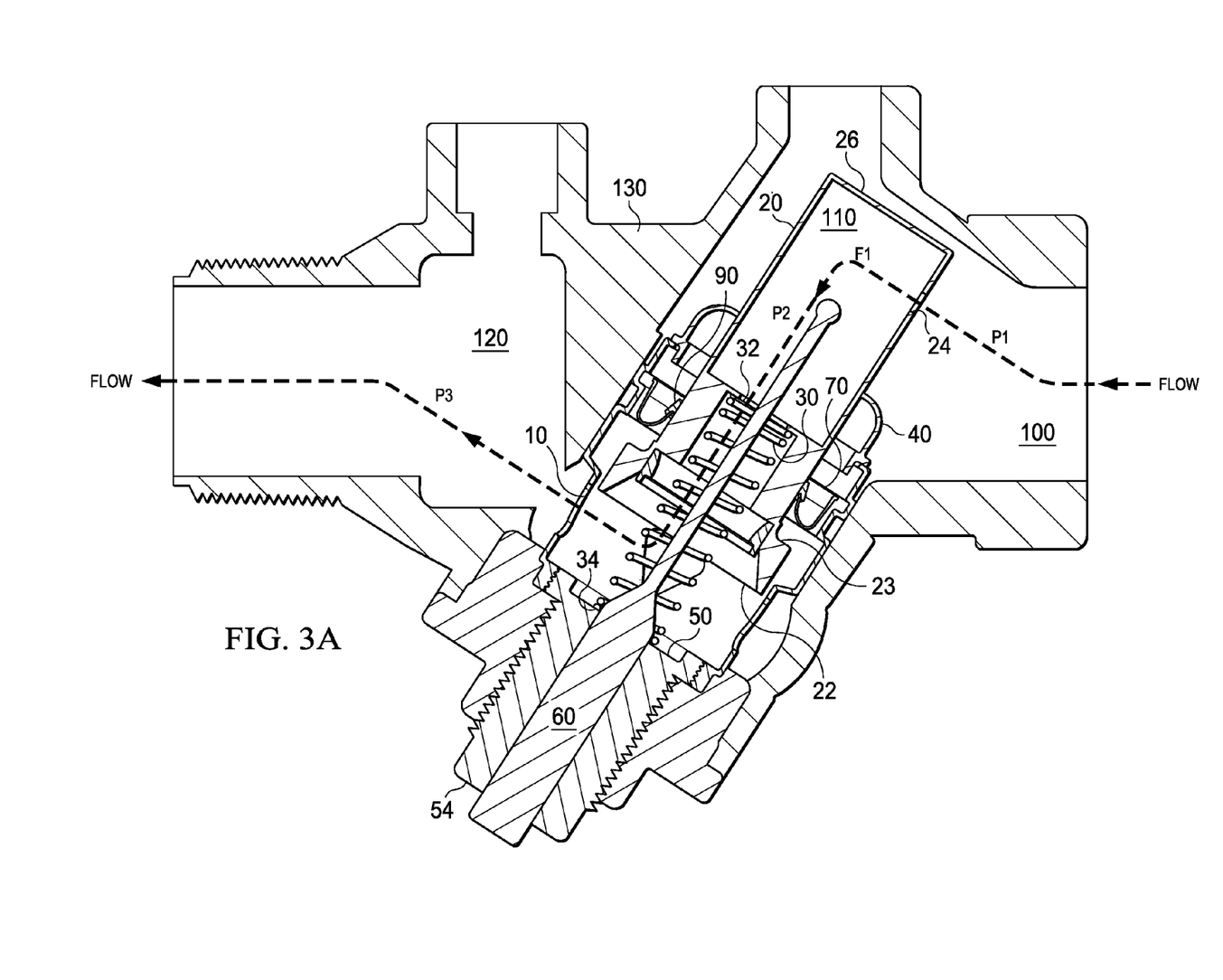
FIG. 3A is a section view, showing one embodiment of the fluid control device according to the present invention mounted within a valve housing.
Figure 3B:
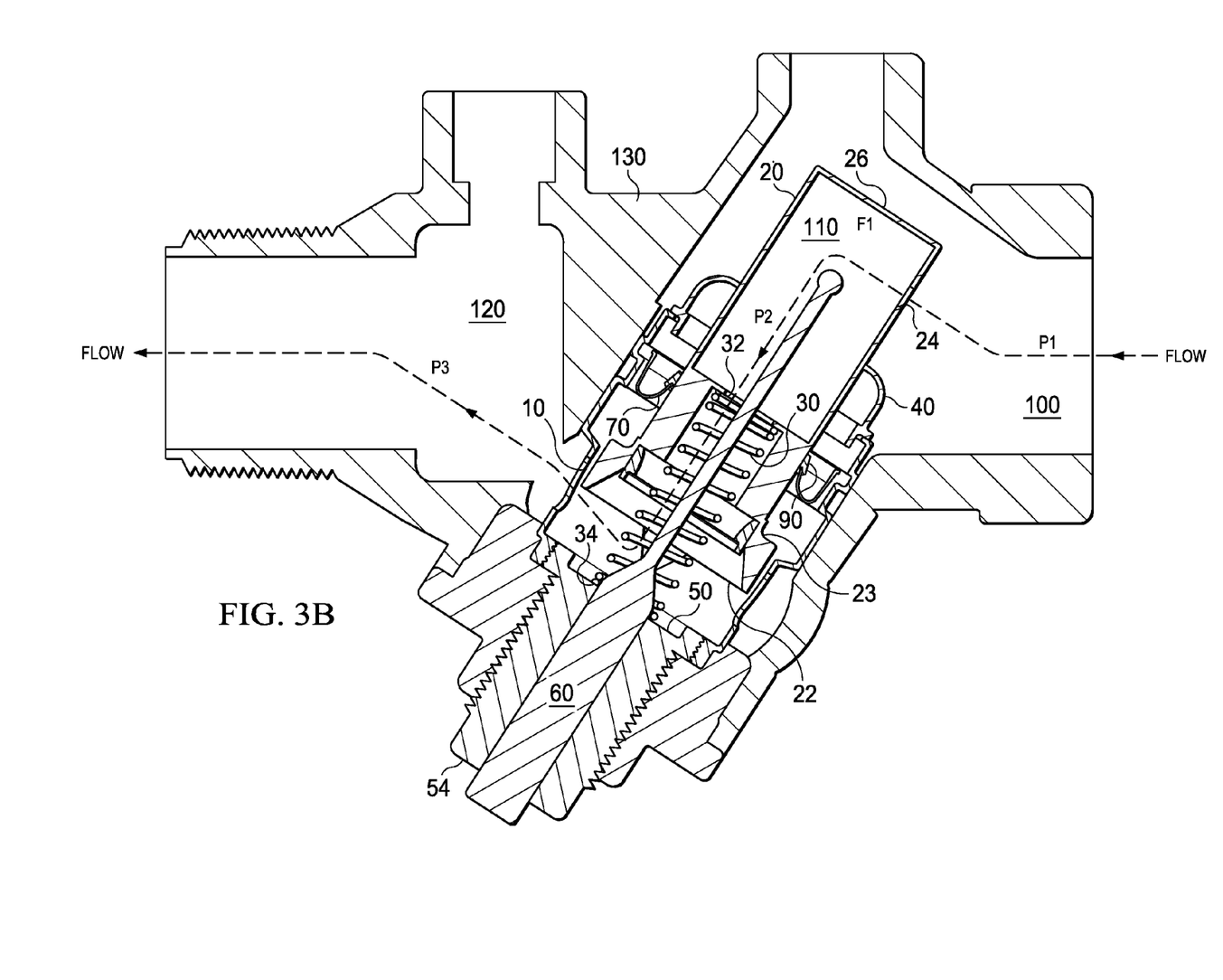
FIG. 3B is a section view, showing one embodiment of the fluid control device according to the present invention mounted within a valve housing and partially actuated.

Referring initially to FIGS. 1 and 2, an embodiment of a flow control device 1 for controlling the flow of fluid is provided and includes, in one form, a casing 10, piston 20, biasing member 30, and a sensor 60 for measuring the fluid pressure within the casing 10. The casing 10 is a generally hollow, cup shaped, cylindrical tube having a sidewall 11, an open end 12 and a substantially closed end 14, wherein the substantially closed end 14 has an opening 52 extending therethrough. Adjacent to the substantially closed end 14 of the casing 10 are one or more fluid outlets 16 cut through the side wall 11 of the casing 10. The piston 20 is a generally cylindrical, cup-shaped, hollow tube having a sidewall 21, a closed end 26, and an open end 28, the open end 28 forming an edge 22. Adjacent to the closed end 26 are one or more piston inlets 24 cut through the side wall 21 of the piston 20 for the flow of fluid therethrough. The piston 20 has an outside diameter sufficiently smaller than the inside diameter of the casing 10 to allow for movement of the piston 20 within the casing 10, although in additional embodiments the piston 20 may have an inside diameter sufficiently larger than the outside diameter of the casing 10 to allow for movement of the piston 20 exterior to the casing 10. The biasing member 30 has a first end 32 for interfacing with the piston 20 and a second end 34 for interfacing with the casing 10, and may be a coil spring, although any similar biasing element, such as rubber or similar polymer, can be used. The sensor 60 for measuring the fluid pressure within the device 1 may be any type of sensor or pressure probe capable of measuring fluid pressure, including for example, a pressure transducer, a connection to a manometer, and a pressure sensor capable of remotely transmitting the pressure readings. The sensor 60 may extend from the interior of the device 1 through the opening 52 of the substantially closed end 14 of the casing 10, and as illustrated in FIGS. 3A and 3B, the pressure sensor 60 may further extend through the valve housing 130. In yet other embodiments, the sensor 60 may extend from the interior of the device 1 to the exterior of the device through any suitable structure or portion of the device 1, and may further extend through the valve housing 130. In yet other embodiments, the sensor 60 may remotely transmit pressure readings from within the device 1, may transmit pressure readings through electrical contact points or circuits interfaced with the device 1 and/or the valve housing 130, may be mounted to a wall of the device 1, may be mounted to the housing 130 but interfaced with the interior of the device 1, or may interface with the device 1 in any other manner suitable for measuring the pressure within the device 1.

In other embodiments, a pipe, or other suitable structure capable of interfacing with the piston 20 may be adapted to operate in substitution of the casing 10, for example, in some embodiments, the casing 10 may be the valve housing 130. These and other embodiments may include separate structures, positioned within the valve housing 130, pipe, or other suitable structure, that operate in substitution of the fluid outlets 16, or other structures of the device 1 as described herein.

Referring again to FIGS. 3A, and 3B, the sensor 60 may be positioned in close proximity to the piston inlet 24 to take pressure readings in close proximity to the piston inlet 24, although the sensor 60 may be positioned anywhere within the flow control device 1 for taking pressure readings anywhere within the flow control device 1. By taking the pressure readings in close proximity to the piston inlet 24, variations in the pressure caused by turbulence, created, for example, by the opening and closing of the casing outlet 16 or the position of the biasing member 30, will be minimized, thereby providing more accurate and precise pressure readings.

Referring again to the embodiment illustrated in FIGS. 1 and 2, the biasing member 30 is positioned within the piston 20 with the first end 32 of the biasing member 30 interfacing with the closed end 26 of the piston 20. The piston 20 and biasing member 30 are positioned within the casing 10 with the second end 34 of the biasing member 30 interfacing with the substantially closed end 14 of the casing 10. In other embodiments, the biasing member 30 may be positioned within the piston 20 with the first end 32 of the biasing member 30 interfacing with a piston seat 80, which piston seat 80 is positioned within the piston 20 for stabilizing and/or positioning the biasing member 30 within the piston 20. In yet other embodiments, the piston seat 80 may have rounded edges for minimizing flow restrictions and turbulence, although edges with different shapes suitable for minimizing flow restrictions and turbulence may also be used. According to other embodiments, the biasing member 30 may be positioned to align with the walls of the piston 20, positioned to align with the walls of the casing 10, external to the walls of the piston 20 but internal to the walls of the casing 10, external to the walls of the casing 10 but internal to the walls of the piston 20, external to both the casing 10 and the piston 20, and can have a tension and size according to the requirements of the chosen embodiment (e.g., longer or shorter than the length of the piston 20).

In operation, an embodiment of the flow control device 1, as illustrated in FIGS. 1, 2, 3A, and 3B, of the present invention operates in response to a pressure differential between the upstream portion of the device 100 (i.e., the area proceeding the piston inlet 24) and the downstream portion of the device 110 (i.e., the chamber formed by the hollow interior of the casing 10 and the hollow interior of the piston 20). Specifically, as the flow of fluid through the piston inlet 24 increases, the upstream fluid pressure will increase across the piston 20 in response to the increased flow, and upon reaching a startup threshold, said upstream fluid pressure acting on the piston 20 overcomes the force of the biasing member 30 and the downstream pressure to compress the biasing member 30 causing the piston 20 to slidably travel within the casing 10 in a manner such that the piston edge 22 regulates the opening and closing of the casing outlet 16 in response to the changing fluid pressure. As the casing outlet 16 closes off, the pressure in the downstream portion of the device 110 (i.e. the interior chamber) increases and, in conjunction with the force of the biasing member 30, works to equalize with the fluid pressure at the upstream portion of the device 100. As the pressure approaches equilibrium, the biasing member 30 actuates the piston 20 upward allowing the casing outlet 16 to reopen. This flow regulating process continues in response to the pressure differential across the flow control device 1. As the flow regulating process operates, pressure readings are taken from the upstream portion of the device 100, by manometer, pressure transducer, or other pressure sensor, and the downstream portion of the device 110, by a pressure sensor 60 located within the downstream portion of the device 110. The rate of flow can be calculated using the pressure readings of the upstream portion of the device 100, downstream portion of the device 110, and the diameter of the piston inlet 24.

Referring again to FIGS. 1, 2, 3A, and 3B, an embodiment of the flow control device 1 that includes a fluid stop 70 for creating a seal between the piston 20 and casing 10 is illustrated. A fluid stop 70 works to prevent or limit the leakage of fluid between the interface of the piston 20 and casing 10, as excessive leakage will affect the calculable flow rate. Such a fluid stop 70 may be in the form of a rubber o-ring, a rolling membrane, or any other structure capable of acting as a fluid stop. For example, where the chosen embodiment of the flow control device 1 utilizes a piston 20 slidably interfacing with the interior of the casing 10, an o-ring or rolling membrane might be employed to prevent or limit fluid leakage between the exterior wall of the piston 20 and the interior wall of the casing 10. As illustrated in FIGS. 1, 2, 3A, and 3B, the fluid stop 70 may be positioned between the piston 20 and the casing 10 by one or more fluid stop retainer 90. A fluid stop retainer 90 may be one or more grooves on the piston 20, casing 10, or both for retaining the fluid stop 70 between the piston 20 and casing 10, one or more retainer rings or other fittings that mount to the piston 20, casing 10, or both and secure the fluid stop 70 between the piston 20 and casing 10, or a bond, such as an adhesive or weld. It should be noted that the use of a fluid stop 70 is not required in the present invention as any opening between the interface of the piston 20 and casing 10 where fluid leakage could occur acts as an additional fixed orifice, the dimensions of which can be measured, and the flow rate through the orifice calculated based on the differential pressure, thereby allowing for the accurate and precise calculating of the overall flow rate through the device 1.

In yet another embodiment, the flow control device 1 may include a piston stop 40, for maintaining the interface between the piston 20 and the casing 10. For example, as illustrated in FIGS. 1, 2, 3A, and 3B, wherein the piston 20 slidably interfaces within the casing 10, the piston stop 40 is a retaining cap that mates to the casing 10 in a manner that retains the piston 20 by interfacing with a protrusion 23 of the piston 20. Piston stops used in other embodiments may include, for example, an extension from the casing 10 that partially enclose the upstream end or head of the piston 20, an extension from the casing 10 that cooperates with a lip, indentation, groove, flange, or other similar feature associated with the piston 20 (for example, where the piston 20 has an exterior flange that interacts with an interior flange of the casing), or any other method for retaining the interface between the piston 20 and casing 10. In yet other embodiments, the interface between the piston 20 and the casing 10 may be maintained by the use of a housing, exoskeleton, or other similar apparatus that surrounds the piston 20 and casing 10. In yet other embodiments, the piston stop 40 may also function as a fluid stop retainer 90. Where an embodiment of the flow control device has a piston 20 that slidably interfaces exterior to or over the casing 10, piston stops of the type described above may be used as described or modified to account for the exterior position of the piston 20 in relation to the casing 10 for maintaining the interface between the piston 20 and the casing 10.

Referring again to FIGS. 1 and 2, the closed end 14 of the casing 10 may include a threaded tension seat 50 for adjusting the force applied by the biasing member 30 against the piston 20. As the tension seat 50 is rotated into the interior of the casing 10, it compresses the biasing member 30, thereby causing the biasing member's 30 force acting against the piston 20 to increase. As the tension seat 50 is rotated out of the interior of the casing 10, it decompresses the biasing member 30, thereby causing the biasing member's 30 force acting against the piston 20 to decrease. In yet other embodiments, adjusting the position of the tension seat 50 raises or lowers the position, in relation to the casing 10, of the biasing member 30 and/or the piston 20, which may affect the position of the piston 20 in relation to the fluid outlets 16, which may affect the fluid pressure needed to actuate the piston. In yet another embodiment, the tension seat 50 has a bolt head, screw head, slot, hex fitting, or other protrusion or indentation for promoting the rotation or adjustment of the tension seat 50. In yet another embodiment, as illustrated in FIGS. 3A and 3B, a tension seat 50, having a threaded shaft 54, is positioned with the tension seat 50 interfacing with the second end 34 of the biasing member 30, wherein the valve housing 130 is threaded to interface with the threaded shaft 54, and said threaded shaft 54 of the tension seat 50 is rotatably positioned in said valve housing 130 for adjusting the position of the tension seat 50 in relation to the casing 10 to compress or decompress the biasing member 30, thereby increasing or decreasing the force of the biasing member 30 acting against the piston 20. In other embodiments, the tension seat may be a separate structure positioned between the closed end 14 of the casing 10 and the second end 34 of the biasing member 30, and may have a threaded shaft interfacing with the closed end 14 of the casing 10 to adjust the position of the tension seat in relation to the casing 10 to compress or decompress the biasing member 30, thereby increasing or decreasing the force of the biasing member 30 acting against the piston 20. In yet another embodiment, an adjustment screw may be threaded through the casing 10, interfaced with the biasing member 30, and rotated to increase or decrease the tension of the biasing member 30. In yet another embodiment, a tension seat having a threaded bore extending from the bottom of the tension seat is positioned between the closed end 14 of the casing 10 and the second end 34 of the biasing member 30 with the threaded bore being slidably enclosed by the closed end 14 of the casing 10, and wherein an adjustment screw is rotatably positioned in said threaded bore for adjusting the position of the tension seat within the casing 10 to compress or decompress the biasing member 30, thereby increasing or decreasing the force of the biasing member 30 acting against the piston 20. In yet another embodiment where the biasing member 30 is exterior to the casing 10, the means for adjusting the force applied by the biasing member 30 against the piston 20 may be an adjustment screw or tension seat, as described above, but modified in an obvious manner to operate with a biasing member 30 that is positioned exterior to the casing 10 (for example, where an adjustment screw rotates through a threaded shaft of a valve housing). In yet other embodiments, an adjustment screw, shaft, bolt head, screw head, slot, hex fitting, or other protrusion or indentation for promoting the rotation or adjustment of the tension seat may have an opening through which the pressure sensor 60 may extend therethrough. In yet other embodiments, an adjustment screw, shaft, bolt head, screw head, slot, hex fitting, or other protrusion or indentation for promoting the rotation or adjustment of the tension seat may extend through the valve housing 130, thereby allowing for adjustment to the flow control device 1 while the valve is functioning within the valve housing 130. In yet other embodiments, an electro-mechanical device, or other suitable device, may be used to calculate the flow rate of the device 1, using, among other factors, one or more readings from the pressure sensor 60, and automatically adjust the flow rate of the device 1 by actuating the tension seat 50 or other adjustment structure for affecting the force applied by the biasing member 30 against the piston 20.

It should be noted that the elements making up any chosen embodiment of the invention described herein may be made of metal, ceramics, plastics, and other materials with suitable properties.

Although embodiments of the flow control device have been described in detail, those skilled in the art will also recognize that various substitutions and modifications may be made without departing from the scope and spirit of the appended claims.

What is claimed is:

1. A flow control assembly for controlling the flow of fluid, the flow control assembly comprising:
   a casing having an interior and a casing outlet;
   a piston having a piston inlet and an edge, wherein said piston interfaces with the casing in a manner such that the edge is cooperable with the casing outlet to control the flow of fluid through the assembly;
   a biasing member for biasing said casing with said piston; and
   a sensor for measuring pressure within the casing.

2. The flow control assembly of claim 1, wherein the biasing member is a spring.

3. The flow control assembly of claim 1, wherein the sensor is a pressure transducer.

4. The flow control assembly of claim 1, wherein the sensor is disposed within the piston.

5. The flow control assembly of claim 4, wherein the sensor is positioned for measuring pressure at a point adjacent to the piston inlet.

6. The flow control assembly of claim 1, further comprising a piston stop.

7. The flow control assembly of claim 6, wherein said piston stop is a retaining cap that interfaces with said piston.

8. The flow control assembly of claim 1, further comprising a fluid stop.

9. The flow control assembly of claim 8, wherein said fluid stop is a rolling membrane.

10. The flow control assembly of claim 1, further comprising a tension seat.

11. The flow control assembly of claim 10, wherein said tension seat interfaces with said biasing member to adjust the force applied by said biasing member to said piston.

12. The flow control assembly of claim 10, wherein said tension seat interfaces with a valve housing.

13. The flow control assembly of claim 1, further comprising a piston seat.

14. The flow control assembly of claim 13, wherein said piston seat has rounded edges.

15. A flow control assembly for controlling the flow of fluid, the flow control assembly comprising:
    a casing having an interior, an upstream casing section, and a downstream casing section, wherein said upstream casing section has a piston opening and said downstream casing section has a fluid exit port;
    a piston having an upstream piston section and a downstream piston section, wherein said upstream piston section has a fluid inlet port, said downstream piston section has an edge, and said piston slidably interfaces with the casing in a manner such that said edge is cooperable with said fluid exit port;
    a biasing member for biasing said casing with said piston; and
    a sensor for measuring the pressure within the casing.

16. The flow control assembly of claim 15, wherein said biasing member is a spring.

17. The flow control assembly of claim 15, wherein the sensor is a pressure transducer.

18. The flow control assembly of claim 15, wherein the sensor is disposed within the interior of the assembly.

19. The flow control assembly of claim 15, wherein the sensor is positioned for measuring pressure at a point adjacent to the fluid inlet port.

20. The flow control assembly of claim 15, further comprising a piston stop.

21. The flow control assembly of claim 20, wherein said piston stop is a retaining cap that interfaces with said piston.

22. The flow control assembly of claim 15, further comprising a fluid stop.

23. The flow control assembly of claim 22, wherein said fluid stop is a rolling membrane.

24. The flow control assembly of claim 15, further comprising a tension seat.

25. The flow control assembly of claim 24, wherein said tension seat interfaces with said biasing member to adjust the force applied by said biasing member to said piston.

26. The flow control assembly of claim 24, wherein said tension seat interfaces with a valve housing.

27. The flow control assembly of claim 15, further comprising a piston seat.

28. The flow control assembly of claim 27, wherein said piston seat has rounded edges.

29. A flow control assembly having a casing, piston, and biasing member, further comprising a sensor for measuring the fluid pressure within at least one of the casing or piston.

30. A method for calculating the rate of flow in a flow control assembly having a fixed fluid inlet and a variable fluid outlet,
    said method comprising:
    measuring the fluid pressure at a position upstream to the fixed fluid inlet,
    measuring the area of the fixed fluid inlet, and
    measuring the fluid pressure at a position downstream of the fixed fluid inlet but upstream of the variable fluid outlet.

31. A flow control device, comprising:
    a casing having a cylindrical sidewall, an open end and a substantially closed end, the cylindrical sidewall having at least one fluid outlet;

a piston having a piston inlet and an edge, wherein said piston interfaces with the cylindrical sidewall such that the edge is cooperable with the at least one fluid outlet to control the flow of fluid through the flow control device;

a biasing member for biasing the piston within the casing;

a sensor for measuring pressure within the piston therein; and the substantially closed end comprising an adjustable a tension seat for adjusting the force applied by the biasing member against the piston.

32. The flow control device of claim 31, wherein the sensor extends through an opening in the tension seat and into the flow control device.

* * * * *